(12) United States Patent
Martin et al.

(10) Patent No.: US 10,490,039 B2
(45) Date of Patent: Nov. 26, 2019

(54) SENSORS FOR DETECTING AND MONITORING USER INTERACTION WITH A DEVICE OR PRODUCT AND SYSTEMS FOR ANALYZING SENSOR DATA

(71) Applicant: AT&T Intellectual Property I, L.P., Atlanta, GA (US)

(72) Inventors: Christopher Martin, Dallas, TX (US); Jason Ngo, Sachse, TX (US); Kyle Wahl, Dallas, TX (US); Samuel Wildman, Dallas, TX (US); Julia Kieserman, New York, NY (US); Tanvir Talukder, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 151 days.

(21) Appl. No.: 15/850,920

(22) Filed: Dec. 21, 2017

(65) Prior Publication Data

US 2019/0197845 A1 Jun. 27, 2019

(51) Int. Cl.
*G08B 13/14* (2006.01)
*H04M 11/00* (2006.01)
(Continued)

(52) U.S. Cl.
CPC ..... *G08B 13/1436* (2013.01); *G06Q 30/0201* (2013.01); *G06Q 30/0205* (2013.01);
(Continued)

(58) Field of Classification Search
CPC ........... G08B 13/1436; G06Q 30/0201; G06Q 30/0205
See application file for complete search history.

(56) References Cited

U.S. PATENT DOCUMENTS 4,972,504 A 11/1990 Daniel et al.
7,036,729 B2 5/2006 Chung
(Continued)

FOREIGN PATENT DOCUMENTS

EP WO2005089320 9/2005
EP WO2011035309 3/2011

OTHER PUBLICATIONS

"133 Startups Disrupting Brick-and-Mortar Retail", What's the Big Data, Sep. 30, 2016.
(Continued)

*Primary Examiner* — Curtis B Odom
(74) *Attorney, Agent, or Firm* — Kilpatrick Townsend & Stockton LLP

(57) ABSTRACT

A detection device coupled to an item includes a sensor configured to detect user interaction with the item and transmit a signal related to the user interaction and the item. A processor of the detection device receives the signal and determines a type of the user interaction and information about the item based on the signal. The detection device is configured to transmit a signal indicating the type of the user interaction and the information about the item. A server is configured to receive the signal (e.g., from the detection device or a HUB) and determine a user interaction profile associated with the item. The user interaction profile can indicate data about one or more users' interaction with the item or data about the item. The server is also configured to output data indicating the user interaction profile via a graphical user interface or store the data.

20 Claims, 5 Drawing Sheets

(51) Int. Cl.
G06Q 30/02 (2012.01)
G08B 13/196 (2006.01)
(52) U.S. Cl.
CPC ... *G06Q 30/0281* (2013.01); *G08B 13/19695* (2013.01); *H04M 11/002* (2013.01)

(56) References Cited

U.S. PATENT DOCUMENTS

| | | | |
|---|---|---|---|
| 7,240,834 | B2 | 7/2007 | Kato et al. |
| 7,248,933 | B2 | 7/2007 | Wildman et al. |
| 7,397,372 | B2 | 7/2008 | Perri et al. |
| 7,881,988 | B2 | 2/2011 | Otani et al. |
| 8,600,828 | B2 | 12/2013 | Bonner et al. |
| 8,620,775 | B2 | 12/2013 | Porter et al. |
| 9,298,954 | B1 | 3/2016 | Ewing et al. |
| 9,514,471 | B2 | 12/2016 | Haugarth |
| 9,697,709 | B2 | 7/2017 | King et al. |
| 9,727,897 | B2 | 8/2017 | Fonzi |
| 9,760,896 | B2 | 9/2017 | Ghosh |
| 2010/0094681 | A1 | 4/2010 | Almen et al. |
| 2013/0252556 | A1 | 9/2013 | Rasband |
| 2013/0268316 | A1 | 10/2013 | Moock et al. |
| 2014/0365273 | A1 | 12/2014 | Hurewitz |
| 2015/0278829 | A1 | 10/2015 | Lu et al. |
| 2016/0055566 | A1 | 2/2016 | Otani et al. |
| 2016/0180404 | A1 | 6/2016 | Stern et al. |
| 2016/0292693 | A1 | 10/2016 | Marum et al. |
| 2016/0307209 | A1 | 10/2016 | Marszalek |
| 2016/0307416 | A1 | 10/2016 | Marszalek et al. |
| 2017/0116618 | A1 | 4/2017 | George |
| 2017/0206571 | A1* | 7/2017 | Dhawan ............. G06Q 30/0281 |

OTHER PUBLICATIONS

"Aisles Have Eyes' Warns That Brick-and-Mortar Stores Are Watching You", http://www.npr.org/2017/02/13/514322899/aisles-have-eyes-warns-that-brick-and-mortar-stores-are-watching-you., Feb. 13, 2017.
"Applied Big Data for Brick-and-Mortar Retail Skyrockets", https://retailnext.net/en/press-release/applied-big-data-for-brick-and-mortar-retail-skyrockets/, Oct. 17, 2012.
"Customer Tracking & Product Interaction", wavestore, Jan. 17, 2016.
"Introducing: Proximity as a Managed Service", Interface, Oct. 25, 2016.
"Products", avaretail.com, Feb. 21, 2015.
"Retail Technology Solutions: Visibility thats Visionary Lets You See the Big Picture", Zebra, Sep. 2017.
"The most advanced in-store analytics solution available", https://retailnext.net/en/how-it-works, 2017.
"The Store of the Future: 150+ Startups Transforming Brick-and-Mortar Retail in One Infographic", https://whatsthebigdata.com/2016/09/30/133-startups-disrupting-brick-and-mortar-retail/, May 17, 2017.
"Tilt It: Tapping into Real World Customer Engagement", Cyrup, Sep. 2017.
"What brick-and-mortar retail can gain from big data", http://www.chainstoreage.com/sites/chainstoreage.com/files/HDI_Retail_WP2_Chain_Store_Content_Syndication.pdf, 2015.
Brandon, "5 Ways to Track In-Store Customer Behavior", http://www.cio.com/article/2383681/retail/5-ways-to-track-in-store-customer-behavior.html, Jul. 13, 2013.
Parada et al., "Measuring User-Object Interactions in IoT Spaces", aDepartament de Tecnologies de la Informaci'o i les Comunicacions, Universitat Pompeu Fabra, Barcelona, Spain, 2015.
Pous et al., "Cricking: customer-product interaction in retail using pervasive technologies", http://dl.acm.org/citation.cfm?id=2496015, Sep. 2013.
Reddy, "13 Retail Companies Using Data to Revolutionize Online & Offline Shopping", https://www.umbel.com/blog/retail/13-retail-companies-already-using-data-revolutionize-shopping-experiences/, May 18, 2015.
Shankar, "Case Study: Smarter Solutions for Retail—Analyzing Customer Product Interaction", Analytics India Magazine, Jun. 24, 2016.
Vivas, "Retail Sensors: Estimote Beacons, "Postscapes"", postscapes.com, Aug. 6, 2013.
Black et al., "Pervasive Computing in the Supermarket: Designing a Context-Aware Shopping Trolley", International Journal of Mobile Human Computer Interaction, 2010, pp. 31-43.
Rashid et al., "Bridging Offline and Online World Through Augmentable Smart Glass Interfaces", Augmented and Virtual Reality: Second International Conference, AVR 2015, pp. 420-431.

* cited by examiner

SENSORS FOR DETECTING AND MONITORING USER INTERACTION WITH A DEVICE OR PRODUCT AND SYSTEMS FOR ANALYZING SENSOR DATA

TECHNICAL FIELD

The present disclosure relates generally to analyzing sensor data. More specifically, but not by way of limitation, this disclosure relates to detecting and monitoring users' interactions with a device or product using sensors.

BACKGROUND

In brick and mortar environments, such as, for example, a retail store, a customer may interact with various items (e.g., devices or products) in the store. In some instances, it can be beneficial for a salesperson to interact with the customer as the customer interacts with the items or after the customer interacts with the item for a period of time. However, in some instances, information about the customer's interaction with the items in the brick and mortar environment, which may be useful for the salesperson, may be unavailable. For instance, a customer may interact with a device (e.g., pick up the device, examine the device, and/or use the device). However, data about the customer's interaction with the device may not be gathered and provided to a salesperson in the store, which may not allow the salesperson to provide useful or beneficial customer service to the customer since information about the user's interaction with the customer is unavailable to the salesperson.

Moreover, certain existing systems and methods for gathering and analyzing data about a customer's interactions or user behavior may require equipment or tools that may be unavailable in a brick and mortar environment. Furthermore, existing methods for monitoring customer behavior or customer interaction with devices or products may require human intervention, e.g., may require a salesperson to monitor the user's interaction with the device or product, and the salesperson may not properly monitor the user's interaction with the device or product. Also, in some instances, the salesperson may have to constantly monitor a customer to gather information about the customer's interaction with a device or product to determine whether the customer requires assistance, which can lead to the salesperson approaching a customer that does not want assistance or cause the customer to feel uncomfortable (e.g., if the salesperson is staring at the customer). Furthermore, data about user behavior in a brick and mortar environment can be sparse as customers may not interact with one or more items in the brick and mortar store.

Thus, existing systems and methods present disadvantages such as, but not limited to, those discussed above. For these and other reasons, improved techniques for detecting and analyzing user interaction with a device or product are therefore desirable.

SUMMARY

Various embodiments of the present disclosure provide sensors for detecting and monitoring user interaction with a device or product and systems for analyzing sensor data.

In one example, a system of the present disclosure includes a detection device attached to an item. The detection device includes a sensor configured to detect user interaction with the item and transmit a signal related to the user interaction and the item. The user interaction can include a movement of a component of the item by a user or a user interaction with a tangible component of the item. The detection device also includes a processor communicatively coupled to the sensor for receiving the signal. The processor of the detection device is configured to determine a type of the user interaction and information about the item based on the signal. The detection device is configured to transmit a signal indicating the type of the user interaction and the information about the item. The system also includes a server communicatively coupled to the detection device and the server is configured to determine a user interaction profile associated with the item. The server can be communicatively coupled to the detection device directly or communicatively coupled to another device that is communicatively coupled to both the server and the detection device for communicating data from the detection device to the server (e.g., a HUB). For instance, in some embodiments, the server can be communicatively coupled to the detection device, obtain or receive a signal directly from the detection device, and determine a user interaction profile associated with the item based on the signal. In another embodiment, the detection device can be communicatively coupled to a central HUB and transmit a signal to the central HUB. The central HUB can then communicate the signal from the detection device to the server and the server can determine a user interaction profile associated with the item based on the signal. The user interaction profile can indicate data about one or more users' interaction with the item or data about the item. The server is also configured to store the user interaction profile in a database and output data based on the user interaction profile via a graphical user interface.

The details of one or more aspects and examples are set forth in the accompanying drawings and the description below. Other features and aspects will become apparent from the description, the drawings, and the claims.

DETAILED DESCRIPTION

Figure 1:
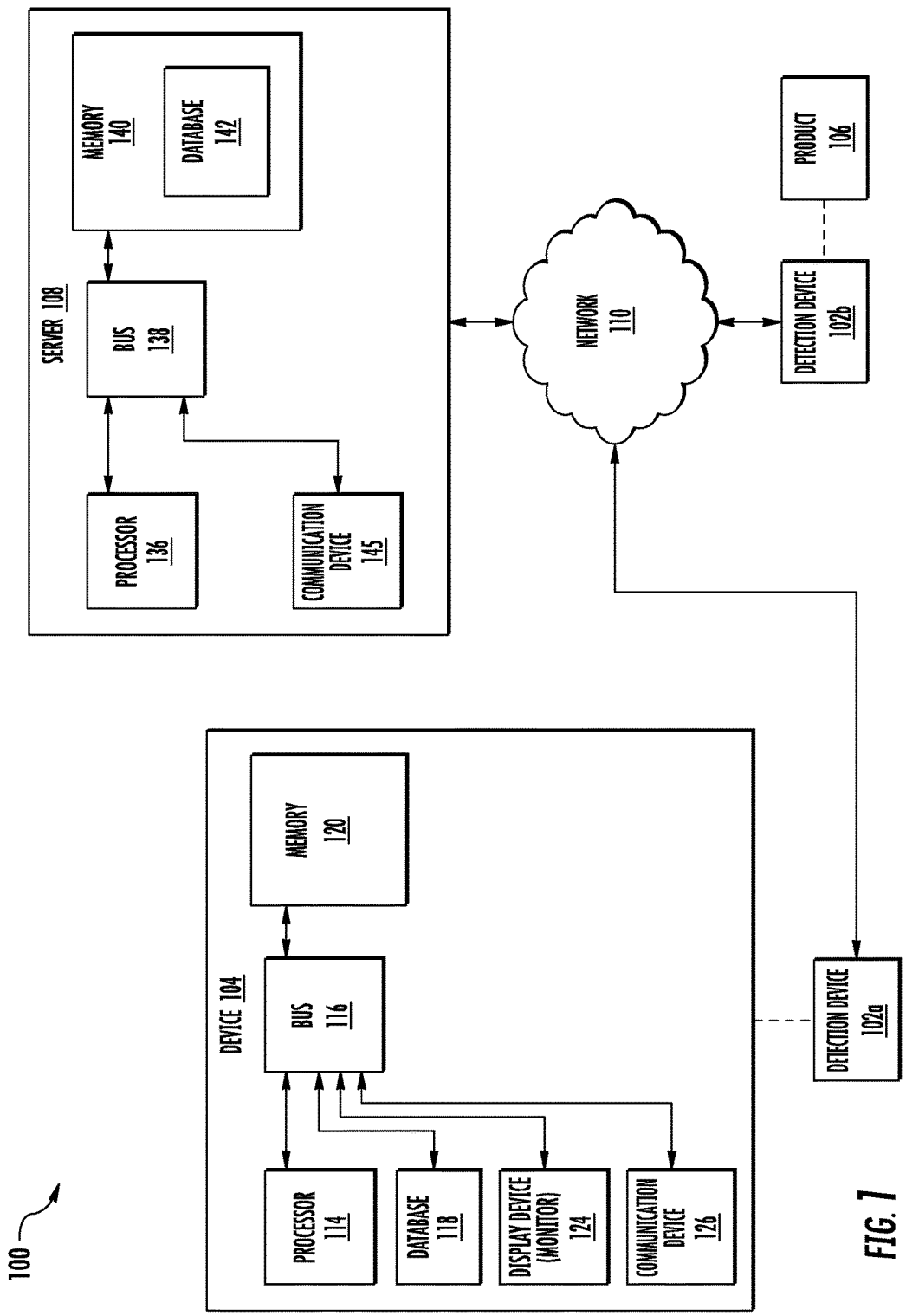
FIG. 1 is a block diagram of an example of an environment in which a detection device for detecting and monitoring users' interaction with a device or a product can operate according to some aspects.

Certain aspects and features of the present disclosure relate to detecting and monitoring users' interaction with a device or a product. Detecting and monitoring a user's interaction with a device or product can include, for example, detecting that a user has picked up a device, is examining the device, is looking at the device, or otherwise interacting with the device or product.

In one example, a system includes a device and a detection device. In some examples, the device can be a device in a brick and mortar store and the detection device can be associated with (e.g., coupled to) the device. The detection device includes a sensor, a processor, and a communication device. The sensor of the detection device is configured to detect user interaction with the device (e.g., a customer's interaction with the device) and transmit a signal to the processor of the detection device indicating the detected user interaction. For instance, the detection device can be coupled to a demonstration item (e.g., a demo device or other product) in the store and the sensor of the detection device can detect that a customer has moved or picked up the item or a component of the item. The processor of the detection device is configured to determine a type of the user interaction or other information about the user interaction or device based on the received sensor signal including, for example, a time, date, location, duration, etc. of the user interaction or a type of the device. As an example, the processor of the detection device determines a number of times a customer interacts with the device or a duration of time that one or more users interact with the device.

In some examples, a server can be communicatively coupled to the detection device to receive data when the detection device determines the type of the user interaction and/or information about the user interaction or device. In another example, the server can be communicatively coupled to a HUB, which is communicatively coupled to the detection device. In this example, the HUB receives data when the detection device determines the type of the user interaction and/or information about the user interaction or device. The HUB can then transmit the data obtained from the detection device to the server. For example, the detection device transmits, via the communication device, data indicating a user interaction with the device, a location or type of the device, a location or type of the user interaction with the device, a duration of the user interaction with the device, or any other data about the user interaction with the device or the device to the server (e.g., directly or via a central HUB). The server can determine a user interaction profile for the device. A user interaction profile can indicate data about one or more users' interaction with the particular device or data about the particular device. For example, the server determines a user interaction profile that indicates an amount of time that one or more users interacted with the particular device. As another example, the server determines a user interaction profile for a device and the user interaction profile indicates a location of the device at the time of one or more user interactions with the device. In some examples, the server stores data received from the detection device in a database. For instance, the server stores data about the device associated with the detection device and data about the user interaction with the device in the database. In some instances, the server can obtain (e.g., receive) data from the detection device in real-time (e.g., as one or more users interacts with the device associated with the detection device) and store the data in the database in real time. Other timings for obtaining the data from the detection devices or the database are also possible.

In another example, the server can obtain data from the detection device or from a HUB communicatively coupled to the detection device and the server can output the data via a display device. In some examples, the server can output the data for determining a user relation operation (e.g., an action that can be taken by a salesperson in the store to interact with the customer) based on a user's interaction with the device associated with the detection device. For instance, the device can be in a brick and mortar store and the server can output, in real time, the data via a display or graphical user interface of one or more remote computing devices, such as a smartphone, cellphone, tablet, or other computing device, which can allow another user of the computing device (e.g., a sales associate in the brick and mortar store) to interact with the user based on the output data. As an example, the server can output, via a display device of a salesperson's smartphone or other computing device, data indicating that a user has interacted with the device for a particular amount of time and the salesperson using the smartphone or other computing device may approach the user based on the amount of time the user has interacted with the device. In some instances, the server can output data via the salesperson's smartphone or computing device as a graph, chart, report, text, etc. For instance, the server can output the data by transmitting a text message to the salesperson's smartphone and the text message can include the data. In this example, the server can output data about the customer's interaction with the device that may indicate to the salesperson that customer is in need of assistance (e.g., data indicating that the customer has interacted with the device for an amount of time above a threshold amount of time for indicating interest in the device, but below a threshold amount of time to have explored a majority of the features of the device). For instance, the threshold amount of time can be a predetermined amount of time obtained or received by the server (e.g., obtained from another device or via user input). In another example, the server can determine the threshold amount of time based on data obtained or received by the server from one or more detection devices. For instance, the server can determine that the threshold amount of time is an average amount of time that one or more users previously spent interacting with the device. As another example, the server can determine that the threshold amount of time is an average amount of time that one or more users previously spent interacting with various devices positioned at various locations. As another example, the server can output a user interaction profile that indicates a location of various devices at a time of various customers' interactions with the devices and the salesperson can modify a position or location of another device based on the data to increase a likelihood of customer interaction with the other device. For instance, the salesperson can position another device at or near a location of a device associated with a threshold amount of user interactions to increase a likelihood of customers interacting with the other device or otherwise modify a layout of devices or products in the store based on the data output by the server. In some examples, the threshold amount of user interactions can be a predetermined amount of user interactions (e.g., an amount of user interactions determined based on historical data indicating an average amount of previous user interactions with one or more devices positioned at one or more locations or a desired amount of user interactions). In still another example, the server can obtain data from one or more detection devices coupled to devices in various stores at various locations and the server can output data received from the detection device as described above and the data can indicate granular data about user interactions with devices at the various stores (e.g., the data can be segmented to provide detailed information about user interaction with devices at the various stores, which can indicate a trend of user interaction within each store or among the various stores).

In some examples, the server can iteratively obtain data from the detection device (e.g., iteratively obtain data directly from the detection device or from a HUB communicatively coupled to the detection device and the server) and iteratively update the database to include the data and/or iteratively output the data.

In some examples, the server can obtain data from a detection device indicating user interaction with one or more devices and also obtain or receive additional data from one or more other computing devices or systems, a database, or from user input (e.g., if a user programs the server to include the data) and the server can correlate the user interaction data and the additional data to generate a user interaction profile that can be used for determining a user relation operation. For instance, the server can obtain conversion data that includes data about a sale of one or more devices. The server can correlate the conversion data and user interaction data about the device to generate a user interaction profile for the device and output the user interaction profile. For example, the server can obtain data about conversions (e.g., sales) of various devices and identify or determine a position or location of a device associated with conversion data above a threshold (e.g., a device sold above a predetermined amount of times). In this example, the server can correlate the position of the device and the conversion data of the device (e.g., a number of sales of the device, an amount of profit generated from the sale of the device, etc.) to generate a user interaction profile that can be output to allow a salesperson to position another device at or near a location of the device to increase a likelihood of customers purchasing the other device or otherwise modify a layout of devices or products in the store based on the data output by the server. In some instances, the server can obtain or receive any other additional data related to an item (e.g., device), correlate the additional data with user interaction data associated with the item, and output the user interaction data and the additional data in substantially the same manner as described above.

In one illustrative embodiment, various detection devices are coupled to various products (e.g., televisions, remotes, computing devices, etc.) in a store. The detection devices can detect customer interaction with the various products and transmit data to the server directly or indirectly (e.g., via a HUB communicatively coupled to both the detection device and the server to communicate data from the detection device to the server) as described above. The server can output data indicating the customers' interactions via a computing device used by a salesperson in the store and the salesperson can approach one or more of the customers based on the customer interaction. For instance, the server can output data via the computing device that indicates that a customer has interacted with a product for a certain amount of time that is longer than a threshold amount of time. In this example, the salesperson can approach the customer based on the data output via the computing device (e.g., to assist the customer with the product or provide information about the product to the customer). As another example, the server can output data indicating a type of a customer's interaction with a product (e.g., that the customer picked up the product several times before putting the product down) and the salesperson can approach the customer based on the data output via the computing device. For instance, data indicating that the customer picked up the product several times before putting the product down can indicate that the customer is interested in purchasing the product and the salesperson can approach the customer to assist the customer with the product or to provide additional information about the product. As still another example, the server can output data indicating a location of various products with which customers frequently interact. In this example, the data can indicate that the location of the various products is associated with a high amount of customer traffic and/or interaction. In this example, a salesperson can modify a layout of the store such as, for example, by positioning other products at or near a location of one of the products, which can encourage customer interaction with the other products.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is a block diagram of an example of an environment 100 in which a detection device 102a-b for detecting and monitoring users' interaction with a device 104 or a product 106 can operate. The environment 100 can be any type of environment in which a user can interact with the device 104 or the product 106 including, for example, a brick and mortar environment (e.g., a retail store). The environment 100 includes the device 104, the product 106, and a server 108. The device 104 can be a user device and the detection device 102a-b can communicate with another device in the environment 100 (e.g., the server 108) via a network 110. In some examples, the network 110 can be any network that facilitates communication of data by the detection device 102a-b and the server 108.

In some examples, the server 108 can transmit data to, or receive data from, a device in the environment 100 (e.g., the detection device 102a-b) or any other device. The server 108 can store data received or obtained in a database 142.

The device 104 can be, for example, any type of user device. For example, the device 104 can be a mobile device (e.g., a mobile telephone, a smartphone, a PDA, a tablet, a laptop, a camera, a tracker, a watch, a wearable device, etc.). The device 104, however, in some embodiments, is a non-mobile device (e.g., a desktop computer, a television, or another type of user device). The product 106 can be any product or item including, for example, any product, item, or component of a product or item, that a user can interact with and/or purchase.

In some examples, the device 104 can include one or more components. For example, the device 104 includes a processor 114, a bus 116, a database 118, and a memory 120. The processor 114 can be communicatively coupled to the memory 120 via the bus 116. The memory 120 may include any type of memory device that retains stored information when powered off. The device 104 can include input/output interface components (e.g., a display device 124 and a communication device 126).

The device 104 can transmit or receive data via the communication device 126. The communication device 126 can represent one or more components that facilitate a network connection for transmitting and receiving data.

The device 104 or the product 106 can be coupled or attached (e.g., physically, mechanically, communicatively, etc.) to one or more detection devices 102a-b that can capture information about the environment 100 in which the device 104 or product 106 is located or information about the device 104 or product 106. The detection device 102a-b can be a sensor that can include, for example, a global positioning system (GPS) unit, an accelerometer, a range sensor, a motion sensor, a camera, a pressure sensor, etc. In some examples, the detection device 102a-b is any device for detecting any user (e.g., customer) interaction with the device 104 or product 106 or detecting information about the device 104 or product. For example, the detection device 102*a-b* can detect that a user picks up the device 104, touches the device 104, is looking at the device 104, or otherwise interacting with the device 104. In some examples, the detection device 102*a-b* can detect data that can be used to determine a type of the user interaction with the device 104 or product 106 or other information about the user interaction including, for example, a time, date, location, duration, etc. of the user interaction with the device 104 or product 106. In some examples, the detection device 102*a-b* can obtain or receive data about a type or other property of the device 104 or product 106.

Figure 2:
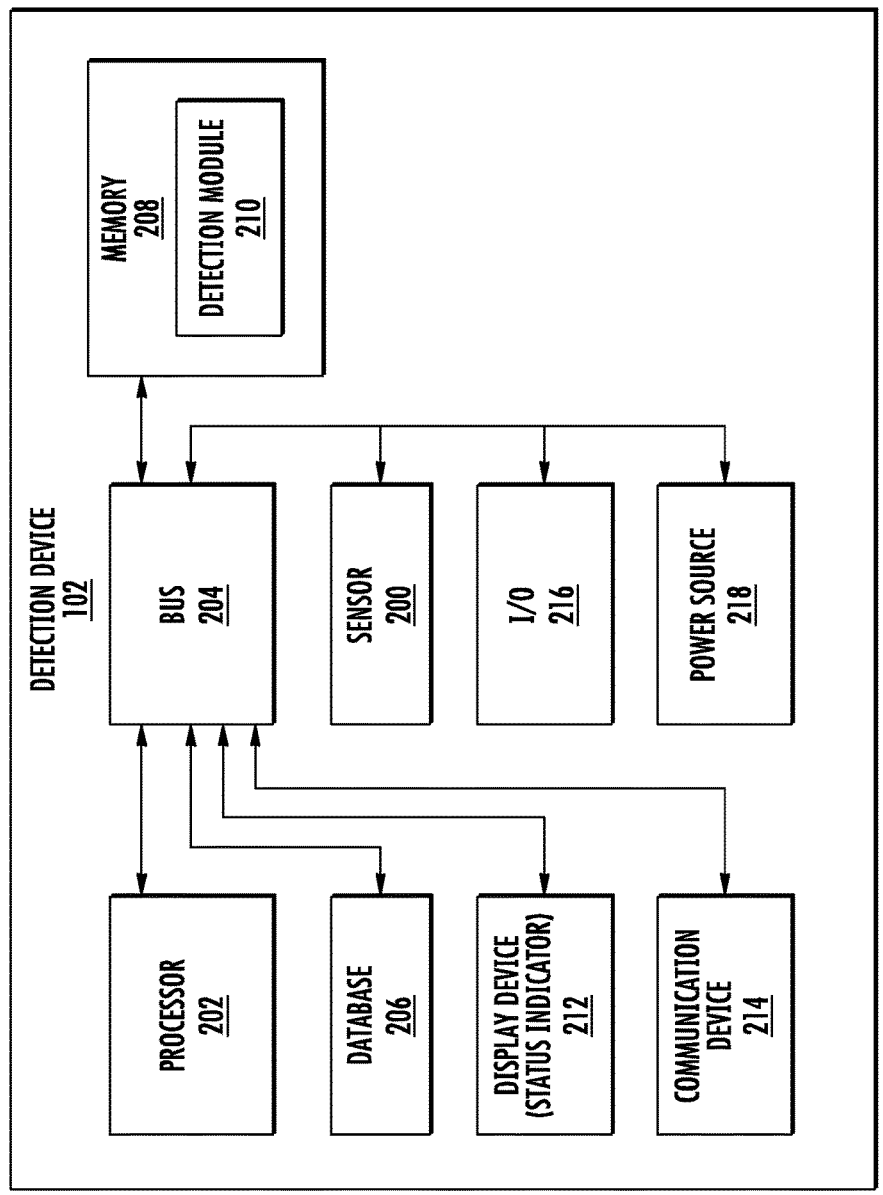
FIG. 2 is a block diagram of a detection device for detecting and monitoring users' interaction with a device or a product according to some aspects.

For example, FIG. 2 is a block diagram of a detection device 102 for detecting and monitoring users' interaction with a device or a product (e.g., a customer's interaction with the device or product) according to some aspects. Detection device 102 is used herein to describe any detection device, including detection devices 102*a-b*.

In some examples, the detection device 102 includes a processor 202, a memory 208, a bus 204, database 206, communication device 214, and a display device 212.

The processor 202 can be communicatively coupled to the memory 208 via the bus 204. The memory 208 may include any type of memory device that retains stored information when powered off. Non-limiting examples of the memory 208 include electrically erasable and programmable read-only memory ("EEPROM"), flash memory, or any other type of non-volatile memory. In some examples, at least some of the memory 208 includes a computer-readable medium from which the processor 202 can read instructions. The computer-readable medium can include electronic, optical, magnetic, or other storage devices capable of providing the processor 202 with computer-readable instructions or other program code. Non-limiting examples of a computer readable-medium include (but are not limited to) magnetic disks, memory chips, ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the display device 212 can be a Light Emitting Diode ("LED") display device that can be configured to output a light. In some examples, the display device 212 can output a light that indicates a status of the detection device 102 (e.g., indicates whether the detection device 102 is in an ON mode or an OFF mode). In another example, the display device 212 can be any type of display device.

The detection device 102 can communicate via the communication device 214 (e.g., communicate with a server or HUB) using various methods, techniques, or protocols and the server can communicate with the detection device 102 using the same or different method, technique, or protocol. In some examples, the communication device 214 can be a radio frequency ("RF") transmitter. If the detection device communicates with a HUB, the communication device 214 may be a lower function device, e.g., may not include a WiFi transceiver.

In some examples, the detection device 102 can include input/output interface components 216 such as, for example, an ON or OFF button or switch. In some examples, the input/output interface components 216 can include any other hardware used to input or output data.

The detection device 102 can also include a power source 218. The power source can be any device or component for providing power for operating the detection device 102. For example, the power source 218 can be a battery such as, for example, a coin-cell battery, or any other suitable type of power source.

In some examples, the detection device 102 can include a sensor 200 for detecting and monitoring users' interaction with a device or a product (e.g., the device 104 or the product 106 of FIG. 1). In some examples, the sensor 200 can detect and/or monitor a user's interaction with a tangible component of the device or product (e.g., detect that the user looking at or touching a tangible component of the device in a brick and mortar store). The memory 208 of the detection device 102 can include one or more modules for detecting and monitoring, via the sensor 200, users' interaction with a device or a product.

For example, the memory 208 includes a detection module 210. The detection module 210 can include one or more instructions stored on a computer-readable storage medium (e.g., the memory 208) and executable by the processor 202. When executed by the processor 202, the computer-executable instructions can cause the processor 202 to determine a type of a user interaction with a device or product or other information about the user interaction including, for example, a time, date, location, duration, etc. of the user interaction with the device or product. In some examples, the computer-executable instructions of the detection module 210 can cause the processor 202 to determine a type of the user interaction with the device 104 or product 106 based on one or more sensor signals from the sensor 200. In some examples, the computer-executable instructions of the detection module 210 can cause the processor 202 to obtain or receive data indicating a type or other property of the device or product. In some examples, the detection module 210 causes the processor 202 to determine information about the user interaction, the product, or the device based on sensor signals received from the sensor 200.

As an example, sensor 200 includes a touch sensor that can detect a touch (e.g., when an object or person touches the device 104 or product 106 of FIG. 1). The detection module 210 can be electrically or communicatively coupled to the sensor 200 and receives data from the sensor 200 indicating the detected touch. The detection module 210 can then cause the processor 202 to determine that a person is interacting with the product or device based on the sensor signal or other data detected by the sensor.

The detection device 102 can additionally or alternatively comprise other types of sensors 200. For example, the sensor 200 can include optical sensors with a view of the device or the product. The detection module 210 can receive sensor data from the sensor 200 and cause the processor 202 to determine that a person is interacting with the product or device based on the data from the sensor 200. In some embodiments, the sensor 200 may be configured to detect multiple aspects of the user interaction. For example, sensor 200 may detect the speed, pressure, and direction of a user interaction, and incorporate this information into the signal transmitted to the processor 202 of the detection device 102.

In another example, the sensor 200 can include a camera or is incorporated into the camera. The sensor 200 can detect a direction of a person's field-of-view with respect to the device or product. For example, the sensor 200 captures an image of an eye of a person looking at or toward the device or product. The sensor 200 can then transmit a signal indicating the captured image to the detection module 210, which causes the processor 202 to determine the direction of the field-of-view of the person relative to the device or the product by using image processing. In another example, the sensor 200 monitors movements of an eye of the person looking at or toward the device or the product and transmits signals indicating the monitored movements to the detection module 210. The processor 202 of the detection device 102 can then determine the direction of the person's field-of-view relative to the device or the product based on the monitored movements. In still another example, the sensor 200 monitors or measures electrical activity of muscles moving an eye of the person looking at or toward the device or the product and the processor 202 of the detection device 102 can determine the direction of the person's field-of-view relative to the device or the product.

In some examples, the sensor 200 detects an eye gaze, line-of-sight, or field-of-view of a person relative to the device or the product through various methods and techniques including, for example, by analyzing the person's body or head posture.

In some examples, the sensor 200 can be configured to detect or obtain data that can be used to determine whether a user interacting with the device or product is the same user that previously interacted with the device or product or a different user. For instance, the sensor can include a camera that can be configured to capture an image of a customer interacting with a device and a sensor for detecting the customer's interaction with the device. In this example, the image and one or more sensor signals can be transmitted to a processor (e.g., the processor 202) for determining whether the user interacting with the device is a user that previously interacted with the device or a new or different user.

As still another example, the sensor 200 can obtain or receive data indicating a type of the device or the product or a property of the device or product. For example, the sensor 200 can obtain or receive data indicating a make, model, serial number, etc. associated with the device, product, or component of the device or product. In some instances, the detection device 102 can obtain or receive data about the type or property of the device or product from another computing device or system, a server (e.g., the server 108 of FIG. 1 or another server), a database, or from user input (e.g., if a user programs the sensor 200 to include the data).

In some examples, the detection device 102 can store data detected or obtained by the sensor 200 or processed by the processor 202 in the database 206.

While in the examples described above, the processor 202 of the detection device can determine a type of a user interaction with a device or product or other information about the user interaction based on one or more sensor signals from the sensor 200, the present disclosure is not limited to such configurations. Rather, in other examples, the detection device 102 can transmit one or more sensor signals (e.g., based on data detected or sensed by the sensor 200) directly to a server (e.g., the server 108 of FIG. 1 or another server) or transmit the sensor signals to a HUB, which can then communicate the sensor signal to the server. The server can then determine a type of a user interaction with a device or product or other information about the user interaction based on the one or more sensor signals in substantially the same manner as described above.

Returning to FIG. 1, in some examples, the detection device 102a-b can be electrically or communicatively coupled to the server 108 and the server 108 can receive data from the detection device 102a-b when the detection device 102a-b determines a type of user interaction with the device 104 or product 106 and/or information about the user interaction, device 104, or product 106. For example, the detection device 102a-b transmits data to the server 108 via a communication device of the detection device 102a-b (e.g., the communication device 214 of FIG. 2). While FIG. 1 illustrates the detection devices 102a-b as being electrically or communicatively coupled to the server 108 directly, the present disclosure is not limited to such configurations. Rather, in other examples, the detection devices 102a-b can be electrically or communicatively coupled to one or more other devices that can obtain data from the detection devices 102a-b and communicate the data to the server 108. For example, FIG. 5 is a block diagram of another example of an environment 500 in which a detection device 504a-c for detecting and monitoring users' interaction with a device or a product can operate according to some aspects.

Figure 5:
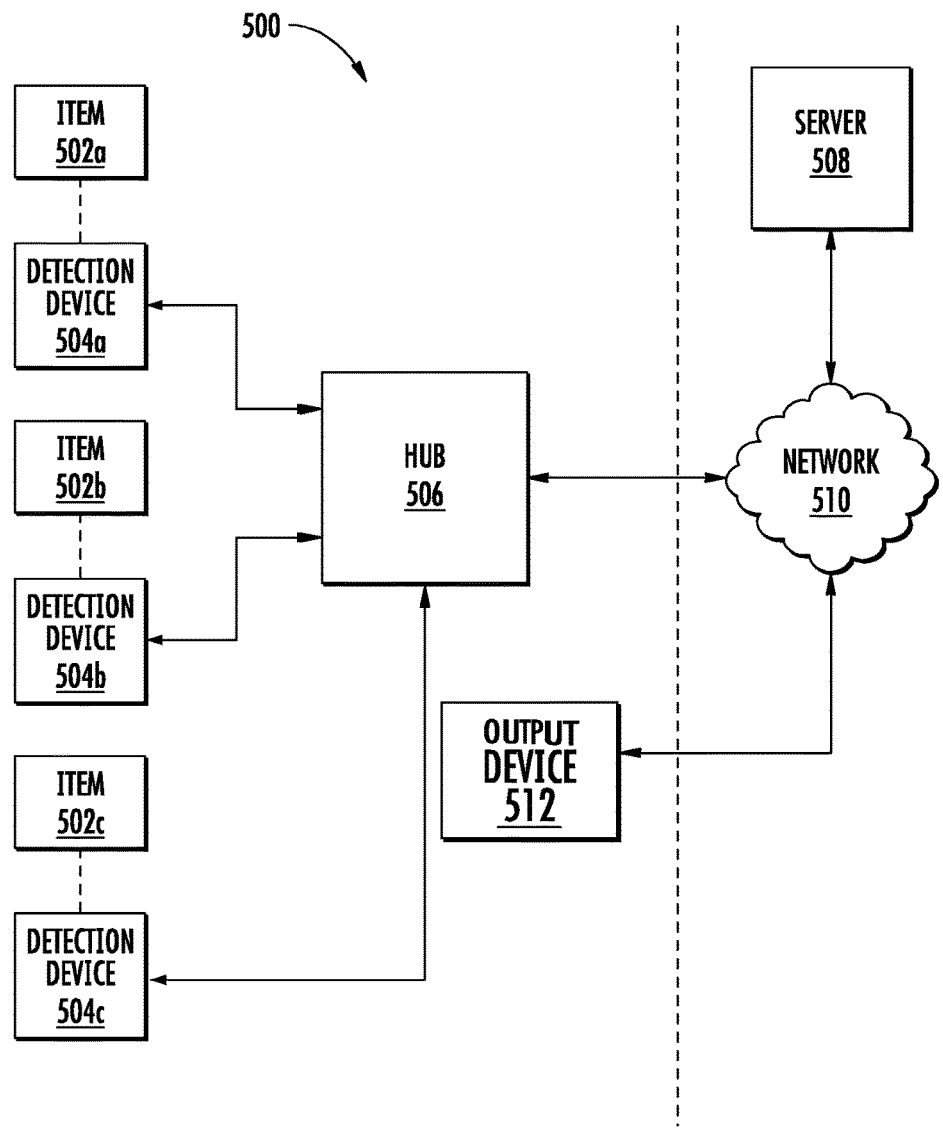
FIG. 5 is a block diagram of another example of an environment in which a detection device for detecting and monitoring users' interaction with a device or a product can operate according to some aspects.

In the example depicted in FIG. 5, the environment 500 includes detection devices 504a-c each of which can be configured in substantially the same manner as the detection device 102 of FIGS. 1-2 and each detection device 504a-c is attached to an item 502a-c (e.g., a device 104 or product 106 of FIG. 1 or any other item). The environment 500 includes a server 508 and a network 510, each of which can be configured in substantially the same manner as the server 108 and the network 110 of FIG. 1, although they need not be.

In this example, the detection devices 504a-c can be electrically or communicatively coupled to a HUB 506 (e.g., a central HUB, an IoT HUB, a radio frequency HUB, etc.), which can be any device for communicating data. The HUB 506 can be electrically or communicatively coupled to the server 508 (e.g., via the network 510). Each detection device 502a-c can transmit data to the HUB 506 via a communication device of the detection device 504a-c (e.g., the communication device 214 of FIG. 2) and the HUB can relay or otherwise communicate the data from the detection device 504a-c to the server 508. For instance, the detection device 504a-c can be electrically or communicatively coupled to the HUB 506 and the HUB 506 can receive data from the detection device 504a-c when the detection device 504a-c determines a type of user interaction with the item 502a-c and/or information about the user interaction or the item 502a-c. In this example, the HUB 506 can transmit the data obtained from the detection device 504a-c to the server 508. The server 508 can then determine a user interaction profile for one or more of the items 502a-c based on data obtained or received from the HUB 506 as described in greater detail below. In some examples, the server 508 can output data (e.g., output a user interaction profile or data obtained from the HUB 508) via a display device or a graphical user interface of an output device 512 as described in greater detail below (e.g., by transmitting the data to the output device 512).

While in the example depicted in FIG. 5, the environment 500 includes the HUB 506, the present disclosure is not limited to such configurations. Rather, in other examples, an environment may include detection devices that communicate directly with the server and detection devices that communication via the HUB.

Returning to FIG. 1, the server 108 can include a processor 136, a bus 138, a memory 140, a database 142, and a communication device 145, each of which may be configured in substantially the same manner as the processor 114, the bus 116, memory 120, database 118, and communication device 126 of the device 104, although they need not be. The server 108 can obtain or receive data detected or determined by the detection device 102a-b. For example, the detection device 102a-b transmits data indicating user interaction with the device 104 or product 106 (e.g., a location or type of the device 104 or product 106 and/or user interaction, a duration of the user interaction with the device 104 or product 106, or any other data about the user interaction with the device 104 or product 106 or data about the device 104 or product 106) to the server 108. In some examples, the detection device 102*a-b* transmits identification data associated with the detection device 102*a-b*. In some examples, identification data includes any data that can be used to identify the detection device 102*a-b*. As an example, identification data can include a make, model, type, serial number, etc. of the detection device 102*a-b*. In some examples, the server 108 can obtain (e.g., receive) identification data associated with the detection device 102*a-b* from another computing device or system, a server (e.g., another server), a database, or from user input (e.g., if a user programs the server 108 to include the data). In some examples, the detection device 102*a-b* transmits data to the server 108 via a HUB (e.g., by transmitting the data to a HUB that then communicates the data to the server 108).

The memory 140 of the server 108 can include one or more instructions stored on a computer-readable storage medium (e.g., the memory 140) and executable by the processor 136. When executed by the processor 136, the computer-executable instructions can cause the processor 136 to perform one or more operations. For example, the memory 140 includes instructions for causing the processor 136 to determine a user interaction profile associated for the device 104 or product 106. A user interaction profile can indicate data about one or more users' interaction with the particular device 104 or product 106. In some examples, a user interaction profile indicates data about the particular device 104 or product. As an example, a user interaction profile can indicate an average amount of time that customers spend interacting with the device 104 or product 106.

For example, the processor 136 receives data indicating user interaction with the device 104 or product 106, a location or type of the device 104 or product 106 and/or user interaction, a duration of the user interaction with the device 104 or product 106, or any other data about the user interaction with the device 104 or product 106 or data about the device 104 or product 106 when the detection device 102*a-b* determines that a user is interacting with the device 104 or the product 106. The processor can then determine a user interaction profile associated with the device 104 or product 106 based on the data.

For example, the processor 136 receives data indicating an amount of time that various users spent interacting with the device 104 when the detection device 102*a-b* determines that a user is interacting with (e.g., touching) the device 104. The processor 136 can also receive data indicating one or more locations of the device 104 when the detection device determines that a user is interacting with the device 104. The processor 136 can then determine a user interaction profile associated with the device 104. As an example, the processor 136 compares the location of various devices 104 and an amount of time that a user interacts with each of the various devices 104 to determine a user interaction profile associated with each device that indicates the amount of time or the average amount of time that users spend interacting with the device 104 at each location or position. For instance, the user interaction profile can include one or more graphs, charts, reports, or other data that shows an amount of time that one or more users spend interacting with the device 104 or an average amount of time that various users spend interacting with the device 104. In some instances, the user interaction profile can indicate a location associated with an amount of user interaction that is above a threshold amount. For example, the processor 136 compares the amount of user interaction with one or more devices at various locations and determines a location associated with an amount of user interaction that is above a threshold amount of user interaction. In some examples, the threshold amount of user interactions can be a predetermined amount of user interactions (e.g., an amount of user interactions determined based on historical data indicating an average amount of previous user interactions with one or more devices positioned at one or more locations).

In some examples, the server 108 can include a machine learning-algorithm module that receives or obtains data about user interaction with the device 104 or product 106. In some examples, the machine learning-algorithm module receives or obtains identification data associated with the detection device 102*a-b* from the database. The machine learning-algorithm module can then train a machine-learning algorithm to determine a user interaction profile associated with the device 104 or product 106 based on the data obtained or received. A machine-learning algorithm can be a machine-learning model that uses statistical learning algorithms that are used to estimate or approximate functions that depend on a large number of inputs in a non-linear, distributed, and parallel manner. An example of a machine-learning algorithm includes, but is not limited to, a neural network. A computer learning machine-learning algorithm can include an interconnected group of nodes, called neurons. A machine-learning algorithm can include input nodes, output nodes, and intermediary nodes. In some examples, the connections between each node are weighted with a set of adaptive weights that are tuned by a learning algorithm, and are capable of approximating non-linear functions of their inputs.

In some examples, the server 108 stores data received from the detection device 102*a-b* or data indicating a user interaction profile in the database 142. In some instances, the server 108 can obtain (e.g., receive) data from the detection device 102*a-b* in real-time (e.g., as one or more users interacts with the device 104 or product 106 associated with the detection device 102*a-b*) and store the data in the database 142 in real time. In some examples, the server 108 can store the data obtained from the detection device 102*a-b* to update the database 142. For instance, the database 142 can include data about the device 104 or the product 106 (e.g., make, model, serial number, type, etc. of the device 104, product 106, or component of the device 104 or product 106). In this example, the server 108 can store data obtained from the detection device 102*a-b* to update the database 142 such as, for example, by storing the detected location of the device 104 at the time of the user interaction with the device 104 in the database 142.

In another example, the server 108 can obtain data from the detection device 102*a-b* and output the data via a display device or a graphical user interface (not shown). For instance, the device 104 or product 106 can be in a brick and mortar store and the server 108 can output, in real time, the data via a display or graphical user interface of one or more computing devices, such as a smartphone, tablet, or other computing device or display device that can be separate or remote from the server 108. In some instances, the server 108 can output the data as an alert, a graph, chart, report, image, text, or any other type of data that can be displayed via the display or graphical user interface of a computing device that is separate or remote from the server 108. As another example, the server 108 can output a user interaction profile that indicates a location of various devices at a time of various user interactions with the devices via a display device or graphical user interface of the computing device. As still another example, the server 108 can output an alert based on the data obtained or received from the detection device 102*a-b*. For instance, the server 108 can output an alert via one or more computing devices in response to determining that an amount of time that a user (e.g., a customer) has interacted with the device 104 or product 106 is above a threshold amount (e.g., above an average amount of time that users previously interact with the device 104 or product 106). In this example, the alert can include data about the device 104 or product 106 and/or the user interaction with the device 104 or product 106. For instance, the alert can indicate a type and location of the device 104 and a type of the user interaction with the device (e.g., that the user has picked up the device or is interacting with a particular component of the device).

In some examples, the server 108 can iteratively obtain data from the detection device 102*a-b* (e.g., iteratively obtain data directly from the detection device 102*a-b* or via a HUB communicatively coupled to the detection device 102*a-b* and the server 108 to communicate data from the detection device 102*a-b* to the server 108) and iteratively update the database 142 to include the data and/or output the data.

In this manner, the detection device 102*a-b* can be used to detect user interactions with the device 104 or product 106 and transmit sensor signals to the server 108, which can output data for monitoring the user interactions.

Although FIG. 1 illustrates a particular arrangement of the environment 100, various additional arrangements are possible. As an example, while FIG. 1 illustrates a certain number of detection devices 102*a-b*, devices 104, and products 106, the present disclosure is not limited to such configurations. Rather, in other examples, the environment 100 may include any suitable number or types of detection devices 102*a-b*, devices 104, or products 106. Also, while in the examples described above, the detection devices 102*a-b* can communicate directly with the server 108 or directly with a HUB that communicates data from the detection devices 102*a-b* to the server 108, the present disclosure is not limited to such configurations. Rather, in other examples, the detection devices 102*a-b* can communicate with one or more additional devices (e.g., a router or other device) that communicate data indicating user interaction detected by the detection devices 102*a-b* to the server 108. Furthermore, in some examples, the detection devices 102*a-b* can communicate with the server 108 using various methods, techniques, or protocols and the server 108 can communicate with one or more other systems or devices using the same or different method, technique, or protocol.

Figure 3:
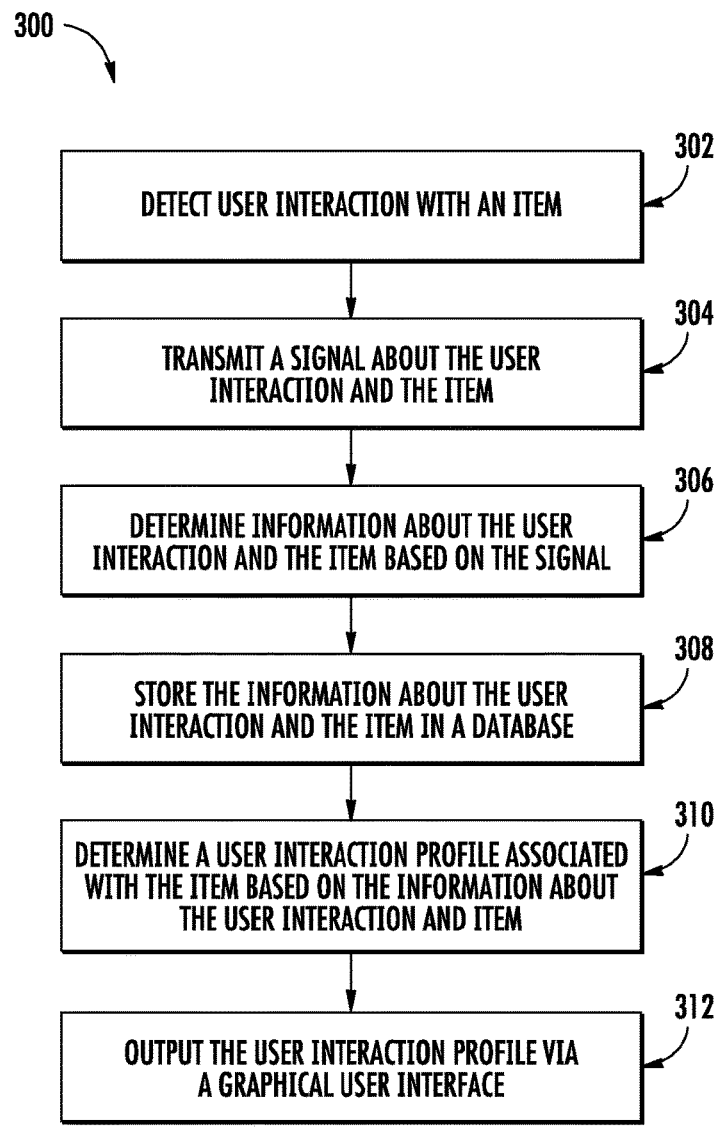
FIG. 3 is a flow chart depicting an example of a process for detecting and monitoring users' interaction with a device or a product can operate according to some aspects.

FIG. 3 is a flow chart depicting an example of a process 300 for detecting and monitoring users' interaction with a device or a product according to some aspects. In some embodiments, the steps in FIG. 3 may be implemented in program code that is executable by a processor, for example, the processor in a general-purpose computer, a mobile device, or a server. In some embodiments, these steps may be implemented by a group of processors. In some embodiments, one or more steps shown in FIG. 3 may be omitted or performed in a different order. Similarly, in some embodiments, additional steps not shown in FIG. 3 may also be performed. The process 300 of FIG. 3 is described with reference to FIGS. 1 and 2, but other implementations are possible.

In block 302, a user interaction with an item is detected. For example, the item can be a device 104 or a product 106, which can be located in an environment 100 in which a user can interact with the device 104 or the product 106 such as, for example, a brick and mortar environment (e.g., a retail store). The item can be coupled to one or more detection devices 102 that can capture information about the environment 100 in which the item is located or information about the item. For example, the detection device 102 can include one or more sensors that can detect that a person picks up the item, touches item, is looking at the item, or otherwise interacting with the item. In still another example, the detection device 102 can detect a user's interaction with various items in the environment 100. The detection device 102 can include one or more sensors of the same or different types including, but not limited to, a touch sensor, a global positioning system (GPS) unit, an accelerometer, a range sensor, a motion sensor, a camera, a pressure sensor, etc.

For example, the detection device 102 can include sensor 200 that is a touch sensor that can detect a touch (e.g., when an object or person touches the device 104 or product 106 of FIG. 1). As another example, the sensor 200 can be configured to detect an eye gaze, line-of-sight, or field-of-view of a person relative to the item through various methods and techniques.

In some embodiments, the detection device 102 may be configured to detect multiple aspects of user interaction with the item. For example, detection device 102 may detect the speed, pressure, and direction of a user interaction with the item.

In some examples, the detection device 102 can detect a type of the user interaction with the item (e.g., whether person is touching the item or looking at the item) or other information about the user interaction including, for example, a time, date, location, duration, etc. of the user interaction with the item. In some examples, the detection device 102 can obtain or receive data about a type or property of the item. For example, the detection device 102 can obtain or receive data indicating a make, model, serial number, etc. associated with the device, product, or component of the device or product. In some instances, the detection device 102 can obtain or receive data about the type or property of the device or product from another computing device or system a server (e.g., the server 108 of FIG. 1 or another server), a database, or from user input (e.g., if a user programs the detection device 102 to include the data).

In block 304, a signal about the interaction with the item is transmitted to a processor 202 of the detection device 102. In some examples, the sensor 200 of the detection device 102 transmits the signal about the interaction with the item the bus 204.

In block 306, information about the user interaction and the item is determined based on the signal from the detection device 102 (e.g., the signal transmitted in block 304). For example, the detection device 102 includes a detection module 210 that causes the processor 202 to determine a type of a user interaction with the item or other information about the user interaction. For example, the processor 202 can determine that a person is touching, looking at, looking toward, or otherwise interacting with the item based on the signal from the sensor 200. For instance, the sensor 200 is a touch sensor and the processor 202 can receive a signal from the sensor 200 indicating a user touching the item and the processor 202 can determine that a user is touching the item based on the signal from the detection device. As another example, the processor 202 can determine a time, date, location, duration, etc. of the user interaction with the item based on the signal from the sensor 200. In some examples, in block 306, the detection module 210 can cause the processor 202 to determine various aspects of the user interaction based on the signal from the sensor 200. For instance, the processor 202 to determine a speed, an amount of pressure, an amount of force, a direction, etc. of the user interaction based on the signal from the detection device.

In another example, the detection device 102 can obtain or receive data indicating a type or property of the item such as, for example, whether the item is a computing device (e.g., a mobile phone, a laptop, a smartwatch, etc.). In another example, the processor 202 can obtain or receive data indicating a make, model, serial number, etc. associated with the item or component of the item. In some instances, the detection device 102 can obtain (e.g., receive) data about a type or property of the device or product from another computing device or system (e.g., the server 108 of FIG. 1 or another server), a database, or from user input (e.g., if a user programs the sensor 200 to include the data) and transmit data about the type or property of the device to the processor 202.

In some examples, in block 306, the detection device 102 can transmit a signal indicating the information about the user interaction and the item. For example, the detection device 102 can transmit the signal indicating the information about the user interaction and the item determined by the processor 202 of the detection device 102. For example, the detection device 102 can be electrically or communicatively coupled to a server 108 and the detection device 102 can transmit the signal indicating the information about the user interaction and the item to the server 108 via the communication device 214 of the detection device 102.

In some examples, in block 306, the detection device can transmit identification data associated with the detection device 102 to the server 108. In some examples, identification data includes any data that can be used to identify the detection device 102 that is coupled to a particular item. As an example, identification data can include a make, model, serial number, etc. associated with the detection device 102. In some instances, the server 108 can store the identification data associated with the detection device 102, along with data identifying the item (e.g., correlate the particular detection device 102 associated with the item in a database).

In another example, a HUB is used as the process proceeds from block 304 to block 306. The detection device 102 can be electrically or communicatively coupled to a HUB (e.g., the HUB 506 of FIG. 5) and the detection device 102 can transmit a signal indicating the information about the user interaction and the item or a signal indicating the information about the user interaction and identification data associated with the detection device 102. The detection device transmits the signal to the HUB via the communication device 214 of the detection device 102 at block 304. In this example, the HUB can be electrically or communicatively coupled to both the detection device 102 and the server 108 and the HUB can communicate data obtained or received from the detection device 102 to the server 108. In block 306, the server 108 may use the information in the signal received from the HUB and information obtained from the database to determine information about the item or other information, such as information about the location of the detection device.

In block 308, the information about the user interaction and the item is stored. For example, the server 108 includes a database 142 and the server 108 stores data received or obtained from the detection device 102 in the database 142. The data can include any data or information about a user interaction with an item or the item detected or any data detected by the detection device 102. For example, the data can include a time, date, location, duration, etc. of a user interaction with an item and a type of the item. In some examples, the server 108 can obtain data from the detection device 102 in real-time (e.g., as the detection device 102 detects a user interaction with an item) and the server 108 can store the data in the database 142 in real time. In some examples, the server 108 can store the data obtained from the detection device 102 in the database 142 to update the database 142. For instance, the database 142 can include data about the item (e.g., make, model, serial number, etc. associated with the item or component of the item). In this example, the server 108 can store data obtained from the detection device 102 in the database 142 to update the database 142 such as, for example, by storing the detected location of the item in the database 142.

In block 310, a user interaction profile associated with the item is determined based on the information about the user interaction and the item. In some examples, the server 108 determines the user interaction profile associated with the item. The server 108 can determine the user interaction profile based on data from one or more detection devices 102.

For example, the server 108 receives data indicating an amount of time that one or more users (e.g., customers) interact with the device 104 when the detection device 102 determines that a user is interacting with (e.g., touching) the device 104. The server 108 can also receive data indicating a location of the device 104 when the detection device 102 determines that the user is interacting with the device 104. The server 108 can then determine a user interaction profile for the device 104. As an example, the server 108 generates a user interaction profile for the device 104 that indicates a number of times that a user interacted with the device 104. As another example, the server 108 generates a user interaction profile that shows an average amount of time that one or more users spend interacting with the device 104. As still another example, the server 108 compares the location of the device 104 and the amount of time that one or more users interacts with the device 104 to determine a user interaction profile for the device that indicates that users interact with devices 104 located at that position for a certain amount of time (e.g., an average amount of time that users interact with the device).

In some examples, the server 108 compares the amount of time that users interact with the device 104 or an average amount of time that various users interact with the device 104 to a threshold. For instance, the threshold can be a predetermined amount of time obtained or received by the server (e.g., obtained from another device or via user input). In another example, the server 108 can determine the threshold based on data obtained or received by the server 108 from one or more detection devices 102a-b. For instance, the server 108 can determine that the threshold amount of time is an average amount of time that one or more users previously spent interacting with the device 104. As another example, the server 108 can determine that the threshold amount of time is an average amount of time that one or more users previously spent interacting with various devices 104 or products 106 positioned at various locations. The server 108 can then determine that a location of the device 104 is associated with a high level of user interaction (e.g., that a user is likely to interact with a device at the location for an extended period of time) in response to determining that the amount of time that various users interact with the device 104 or the average amount of time that various users spend interacting with the device 104 at that location is above the threshold. As another example, the server 108 can determine that a location of the device 104 is associated with a low level of user interaction (e.g., that a user is not likely to interact with a device at the location for an extended period of time) in response to determining that the amount of time that various users interact with the device 104 or the average amount of time that various users spend interacting with the device 104 at that location is below the threshold.

In some examples, the server 108 can determine a user interaction profile that indicates an amount of time that one or more users interacted with the device 104. As another example, the server 108 can determine a user interaction profile for various devices 104 with which various users have interacted and the user interaction profile for the various devices indicates a location of the various devices 104 at the time of the various user interactions. In this example, the user interaction profile can allow a salesperson, for example, to notice one or more areas at which users (e.g., customers) are interacting with the various devices 104. As still another example, the server 108 can determine a user interaction profile for various devices 104 with which various users have interacted and the user interaction profile indicates a time (e.g., time of day) of the various user interactions.

In still another example, the server 108 can determine a user interaction profile that indicates a particular location or position of an item at which a user is likely to interact with the item. For example, and with reference to FIG. 1, the device 104 and the product 106 can be positioned in a brick and mortar environment and the server 108 obtains data indicating a location of the device 104 and product 106 at a time of various user interactions with the device 104 and the product 106. In this example, the server 108 determines that positioning another device or product at a particular area or location within the brick and mortar environment will likely cause a user to interact with the device or product. For instance, the server 108 identifies one or more locations within the brick and mortar environment at which one or more users interacted with the device 104 or the product 106. The server 108 can then determine one or more locations associated with a high amount of user interaction with the device 104 or the product 106 (e.g., determine at which location one or more users interacted with the device or the product 106 most frequently, for the longest period of time, etc.). For instance, the server 108 can compare a number of user interactions detected at each location, a duration of each detected user interaction, a frequency of each detected interaction, etc. to determine a location associated with a high amount of user interaction with the device 104 or the product 106 (e.g., determine the location at which users interacted with a device most frequently as compared to other locations). In this example, the server 108 can determine or generate a user interaction profile that indicates a particular location or position of an item at which a user is likely to interact with an item (e.g., the user interaction profile can include one or more of the identified locations associated with a high amount of user interactions). In some examples, the server 108 can determine a location associated with a high amount of user interaction with the device 104 or the product 106 based on a threshold. For instance, the server 108 can determine that a location is associated with a high amount of user interaction in response to determining that data indicating user interaction with a device 104 or product 106 at that location is above the threshold. As another example, the server 108 can determine that a location is associated with a low amount of user interaction in response to determining that data indicating user interaction with a device 104 or product 106 at that location is below the threshold. In some examples, the threshold can be a predetermined amount of user interactions (e.g., an amount of user interactions determined based on historical data indicating an average amount of previous user interactions with one or more devices positioned at one or more locations).

In some examples, the server 108 can determine a user interaction profile for one or more components or elements of the device 104 or product 106. For instance, the server 108 can obtain data from one or more detection devices 102 indicating a component or element of a device 104 with which a user is interacting. As an example, the server 108 can obtain data indicating that the device 104 is a vehicle and that a customer is interacting with a trunk of the vehicle (e.g., opening or closing the trunk). In this example, the server 108 can determine one or more components or elements of the device 104 with which users interact with more frequently and generate a user interaction profile for the device 104. As an example, the server 108 can determine that customers interact with a media console of a vehicle or trunk of a vehicle more than other components of the vehicle (e.g., based on data from the detection devices 102 indicating that users interact with the trunk or media console more times than they interact with other components). In this example, the server 108 can generate a user interaction profile that indicates an amount of times or a frequency with which users interact with various components of the device 104 and a component or element that users interact with most frequently.

In some examples, the server 108 can obtain data from a detection device 102 indicating user interaction with one or more devices 104 or products 106 and also obtain or receive additional data from one or more other computing devices or systems, a database, or from user input (e.g., if a user programs the server 108 to include the data) and the server 108 can correlate the user interaction data and the additional data to generate a user interaction profile that can be used for determining a user relation operation. For instance, the server 108 can obtain conversion data that includes data about a sale of one or more devices 104. The server 108 can correlate the conversion data and user interaction data about the device 104 to generate a user interaction profile for the device 104 and output the user interaction profile. For example, the server 108 can obtain data about conversions (e.g., sales) of various devices 104 and identify or determine a position or location of a device 104 associated with conversion data above a threshold (e.g., a device sold above a predetermined amount of times). In this example, the server 108 can correlate the position of the device 104 and the conversion data of the device 104 (e.g., a number of sales of the device, an amount of profit generated from the sale of the device, etc.) to generate a user interaction profile that can be output to allow a salesperson to position another device at or near a location of the device 104 to increase a likelihood of customers purchasing the other device or otherwise modify a layout of devices or products in the store based on the data output by the server 108. In some examples, correlating conversion data with user interaction data, as described above, can indicate a threshold interaction time associated with conversions. For instance, the server 108 can obtain conversion data associated with a device 104 and correlate the conversion data with user interaction data associated with the device 104 (e.g., a number of times that the device 104 is picked up or looked at, a frequency with which customers picked up the device 104, etc.) In this example, the server 108 can correlate the conversion data and the user interaction data to generate a user interaction profile for the device 104 that can indicate, for example, a threshold amount of times that users interact with the device 104 prior to purchasing the device (e.g., an average amount of times that users spend interacting with the device before deciding to purchase the device).

In some instances, the server 108 can obtain or receive any other additional data related to a product 106 or device 104, correlate the additional data with the user interaction data associated with the product 106 or the device 104, and output the user interaction data and the additional data in substantially the same manner as described above.

In block 312, the user interaction profile is output via a graphical user interface. For example, the server 108 can output the user interaction profile via a display or graphical user interface of one or more computing devices such as, for example, a display or graphical user interface of a smartphone, tablet, or other computing or display device that can be separate or remote from the server 108. In some examples, the server 108 can output, in real time, data indicating the user interaction profile via the display or graphical user interface. As an example, the server 108 can output a user interaction profile that indicates a location of various items at a time of various user interactions with the items via a display device or graphical user interface of a computing device. In some examples, in block 312, the server 108 can output any data obtained or received from the detection device 102. As still another example, the server 108 can output an alert based on the data obtained or received from the detection device 102. For instance, the server 108 can output an alert via one or more computing devices or graphical user interfaces in response to determining that an amount of time that a user (e.g., a customer) has interacted with the device 104 or product 106 is above a threshold amount (e.g., above an average amount of time that users previously interacted with the device 104 or product 106). In some examples, the alert can include data about the device 104 or product 106 and/or the user interaction with the device 104 or product 106. For instance, the alert can indicate a type and location of the device 104 and a type of the user interaction with the device (e.g., that the user has picked up the device or is interacting with a particular component of the device 104). In some instances, the server 108 can output the alert to indicate to another user associated with the graphical user interface or computing device (e.g., a salesperson) that a person interacting with the device 104 or product 106 (e.g., a customer) may require assistance and the location of the person interacting with the device 104 or product 106 (e.g., a location of the user interaction). In some instances, the server 108 can output an alert or a user interaction profile as described above by transmitting data indicating the alert or user interaction profile to a remote computing device. For instance, the server 108 can output the user interaction profile or alert by transmitting a text message or other data to a salesperson's computing device (e.g., smartphone, tablet, etc.) and text message can include the alert or the user interaction profile.

Figure 4:
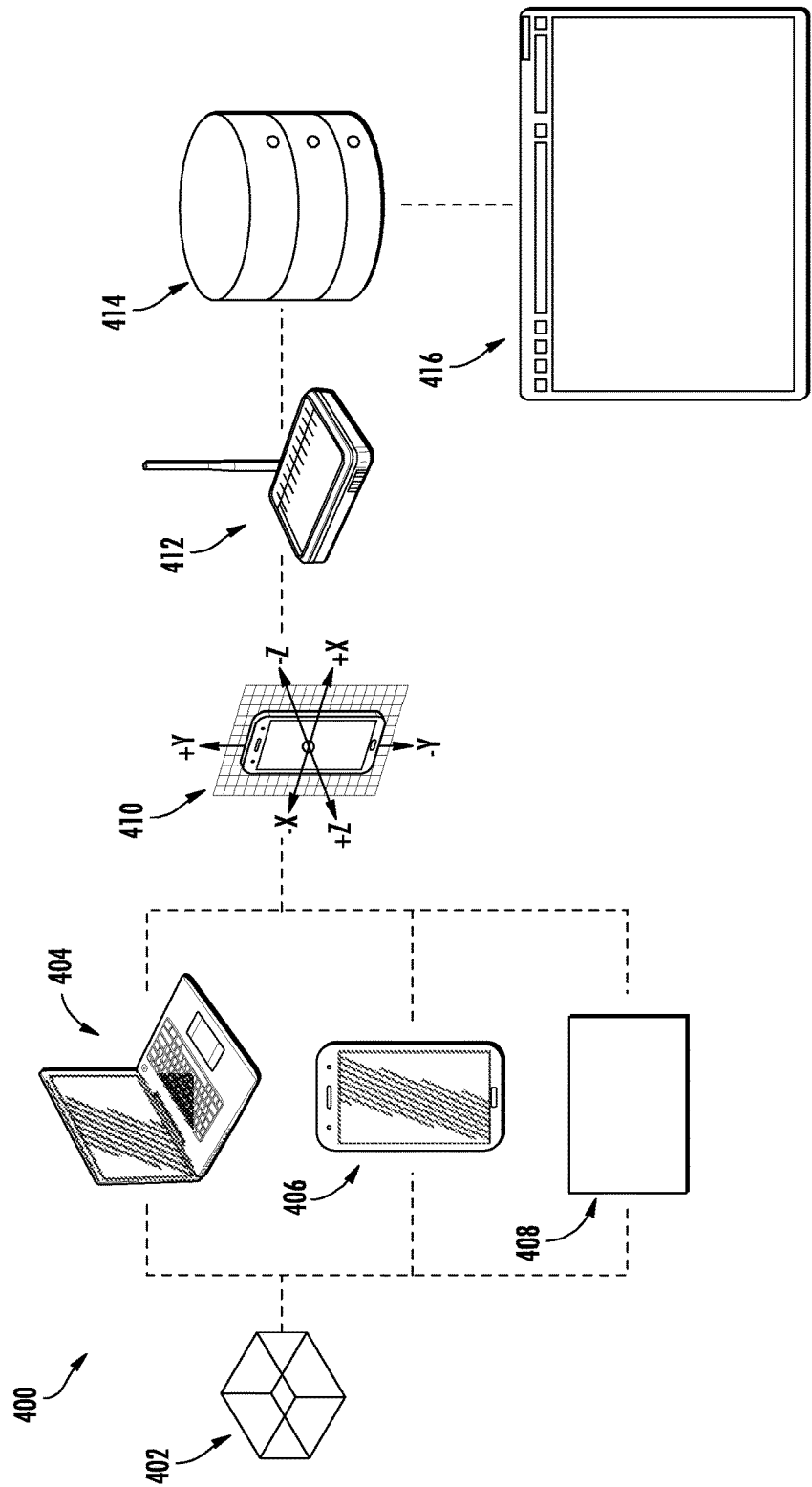
FIG. 4 is an image depicting an example of an environment in which a detection device for detecting and monitoring users' interaction with a device or an item can operate according to some aspects.

FIG. 4 is an image depicting an example of an environment 400 in which a detection device 402 for detecting and monitoring users' interaction with a device 404, 406, or an item 408 can operate according to some aspects.

In this example, the environment 400 includes one or more detection devices 402 that can be configured in substantially the same manner as the detection device 102 of FIG. 1. The environment 400 can also include devices 404, 406, which can each be configured in substantially the same manner as the device 104 of FIG. 1, respectively, although they need not be. The environment 400 can also include an item 408, which can be any item, device, product, or component of an item, device, or product, with which a user can interact.

Each of the one or more detection devices 402 can be coupled to (e.g., physically or mechanically attached) each device 404, 406 or the item 408 and the detection devices 402 can capture or detect information about the environment 400 in which the device 404, 406 or the item 408 is located, information about user interaction with the device 404, 406 or the item 408, or information about the device 404, 406 or the item 408.

For example, the detection device 402 can include one or more sensors that can detect user interaction 410 with the device 406 including, for example, that a person picks up, touches, is looking at, or otherwise interacting with the device 406.

An IoT device HUB 412 (e.g., the HUB 506 of FIG. 5) can be communicatively coupled to the detection device 402 to receive data when the detection device 402 detects user interaction with the device 404, 406 or the item 408 or when a processor of the detection device 402 determines the type of the user interaction and/or information about the user interaction, device, or item. For example, the detection device 402 transmits, via a communication device of the detection device 402, data indicating a user interaction with the device 406, a location or type of the device 406 and/or user interaction, a duration of the user interaction with the device 406, or any other data about the user interaction with the device 406 or data about the device 406. The IoT device HUB 412 can then transmit data obtained or received from the detection device 402 to a database 414 of a server (e.g., the database 142 of the server 108 of FIG. 1).

The server (not shown) can then determine a user interaction profile associated with the device 406 based on the data. For example, the server determines a user interaction profile that indicates an amount of time that one or more users interacted with the device 406.

In some examples, the server stores data received from the HUB 312 in the database 414. For instance, the server stores data about the device 406 associated with the detection device 402 and data about the user interaction with the device 406 in the database 414. In some instances, the server can obtain (e.g., receive) data from the IoT device HUB 412 in real-time (e.g., as one or more users interacts with the device 406 and the detection device 402 transmits data about the interaction to the IoT device HUB 412 that then communicates the data to the server) and store the data in the database 414 in real time.

In some examples, the server can obtain data from the IoT device HUB 412 and output the data (e.g., in real time) via a display device. In some examples, the server can output, in real time, the data via a display or graphical user interface of one or more computing devices 416, such as a smartphone, tablet, or other computing device, which can allow another user of the computing device (e.g., a sales associate in a brick and mortar store) to interact with the user based on the output data. As an example, the server can output data indicating that a user has interacted with the device 406 for a particular amount of time and the user of the computing device may approach the user based on the amount of time the user has interacted with the device 406. In another example, a computing device 416 can access or obtain data from the server and output the data via a display or graphical user interface of the computing device.

In some examples, an item, product, or device described herein can include any device, product, item, or component of a device, product, or item. For instance, an item can include a vehicle and a detection device can be coupled to one or more components or features of the vehicle (e.g., a seat, trunk, wheel, pedal, control component, etc. of the vehicle) for detecting user interaction with the component or feature of the vehicle. As another example, an item can include a television or a television remote and a detection device can be coupled to the television or television remote for detecting user interaction with the television or television remote.

While in the examples described above, the detection devices 102a-b are described as including certain types of sensors for detecting certain types of user interaction with an item, the present disclosure is not limited to such configurations. Rather, in other examples, the detection devices 102a-b can include any number and/or any type of sensor for detecting, sensing, or measuring any data about an item, an environment in which the item is located, or any user interaction with the item.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a detection device coupled to an item, the detection device comprising:
      a sensor configured to detect user interaction with the item and transmit a sensor signal related to the user interaction and the item, wherein the user interaction comprises a movement of a component of the item by a user; and
      a processor communicatively coupled to the sensor for receiving the sensor signal, the processor of the detection device configured to:
         determine a type of the user interaction and information about the item based on the sensor signal; and
         transmit a signal indicating the type of the user interaction and the information about the item; and
   a server communicatively coupled to the detection device, the server configured to:
      determine a user interaction profile for the item, the user interaction profile indicating data about the user interaction with the item or data about the item;
      store the user interaction profile in a database; and
      output data indicating the user interaction profile via a graphical user interface.

2. The system of claim 1, wherein the server is further configured to determine the user interaction profile by determining at least one of: an amount of time that the users spends interacting with the item, and a number of times that the user interacts with the item.

3. The system of claim 1, wherein the server is further configured to determine the user interaction profile by:
   receiving data indicating a location of the item at a time that users interact with the item; and
   determining an amount of time that users spend interacting with the item and the location of the item at the time that users interact with the item, wherein the user interaction profile indicates the amount of time or an average amount of time users spend interacting with the item at the location.

4. The system of claim 3, wherein the server is further configured to determine the user interaction profile associated with the item by:
   comparing the amount of time that users spend interacting with the item at the location to a threshold; and
   determining that the location is associated with a high or low level of user interaction in response to determining that the amount of time that users interacts with the item above or below the threshold and wherein the user interaction profile indicates whether the location is associated with the high or low level of user interaction.

5. The system of claim 1, wherein the server is further configured to determine the user interaction profile by:
   obtaining data indicating a plurality of locations of a plurality of items at a time users interact with each of the plurality of items;
   identifying a location of the plurality of locations associated with a high amount of user interactions by comparing data about users' interactions with each of the plurality of items to a threshold; and
   determining the user interaction profile based on the identified location, wherein the user interaction profile indicates the location associated with the high amount of user interactions.

6. The system of claim 1, wherein the server is configured to output data indicating the user interaction profile at a time of the user interaction with the item.

7. The system of claim 1, wherein the detection device comprises at least one of an accelerometer or a radio frequency ("RF") transmitter.

8. The system of claim 1, wherein the sensor of the detection device comprises a touch sensor configured to detect user interaction with the item.

9. The system of claim 1, wherein the sensor of the detection device comprises a camera configured to capture an image associated with an eye of the user and the processor of the detection device is configured to determine a direction of a field of view of the user relative to the item based on the image.

10. A method comprising:
   detecting, by a detection device coupled to an item, user interaction with the item, wherein the detection device comprises: a sensor configured to detect the user interaction and wherein the user interaction comprises user interaction with a tangible component of the item;
   transmitting, by the sensor of the detection device, a sensor signal related to the user interaction;
   receiving, by a processor of the detection device, the sensor signal from the sensor of the detection device;
   determining, by the processor of the detection device, a type of the user interaction based on the sensor signal;
   transmitting, by the detection device, a signal indicating the type of the user interaction;
   receiving, by a central HUB communicatively coupled to the detection device, the signal from the detection device;
   transmitting, by the HUB, the signal from the detection device to a server communicatively coupled to the central HUB;
   determining, by the server, a user interaction profile for the item, the user interaction profile indicating data about the user interaction with the item or data about the item; and
   outputting, by the server, data indicating the user interaction profile via a graphical user interface.

11. The method of claim 10, wherein determining the user interaction profile comprises:

determining, by the server, sensor identification information from the signal; and using, by the server, a database to determine information about the item based on the sensor identification.

12. The method of claim 10, wherein determining the user interaction profile comprises determining at least one of: an amount of time that the user spends interacting with the item, and a number of times that the user interacts with the item.

13. The method of claim 10, wherein determining the user interaction profile comprises:

receiving, by the server, data indicating a location of the item at a time that users interact with the item; and determining, by the server, an amount of time that users spend interacting with the item and the location of the item at the time that users interact with the item, wherein the user interaction profile indicates the amount of time or an average amount of time users spend interacting with the item at the location.

14. The method of claim 13, wherein determining the user interaction profile comprises:

comparing, by the server, the amount of time that users spend interacting with the item at the location to a threshold; and determining, by the server, that the location is associated with a high or low level of user interaction in response to determining that the amount of time that users interacts with the item above or below the threshold and wherein the user interaction profile indicates whether the location is associated with the high or low level of user interaction.

15. The method of claim 10, wherein determining the user interaction profile comprises:

obtaining, by the server, data indicating a plurality of locations of a plurality of items at a time users interact with each of the plurality of items;

identifying, by the server, a location of the plurality of locations associated with a high amount of user interactions by comparing data about users' interactions with each of the plurality of items to a threshold; and determining, by the server, the user interaction profile based on the location, wherein the user interaction profile indicates the location associated with the high amount of user interactions.

16. The method of claim 11, wherein determining the type of the user interaction and information about the item based on the sensor signal comprises:

capturing, by a camera of the detection device, an image associated with an eye of the user; and determining, by the processor of the detection device, a direction of a field of view of the user relative to the item based on the image.

17. A method comprising:

detecting, by a detection device coupled to an item, user interaction with the item, wherein the detection device comprises: a sensor configured to detect the user interaction and wherein the user interaction comprises user interaction with a tangible component of the item;

transmitting, by the sensor of the detection device, a sensor signal related to the user interaction and the item;

receiving, by a processor of the detection device, the sensor signal from the sensor of the detection device;

determining, by the processor of the detection device, a type of the user interaction and information about the item based on the sensor signal;

transmitting, by the detection device, a signal indicating the type of the user interaction and the information about the item;

receiving, by a central HUB communicatively coupled to the detection device, the signal from the detection device;

transmitting, by the HUB, the signal from the detection device to a server communicatively coupled to the central HUB;

determining, by the server, a user interaction profile for the item, the user interaction profile indicating data about the user interaction with the item or data about the item; and outputting, by the server, data indicating the user interaction profile via a graphical user interface.

18. The method of claim 17, wherein determining the user interaction profile comprises determining at least one of: an amount of time that the user spends interacting with the item, and a number of times that the user interacts with the item.

19. The method of claim 17, wherein determining the user interaction profile comprises:

receiving, by the server, data indicating a location of the item at a time that users interact with the item; and determining, by the server, an amount of time that users spend interacting with the item and the location of the item at the time that users interact with the item, wherein the user interaction profile indicates the amount of time or an average amount of time users spend interacting with the item at the location.

20. The method of claim 19, wherein determining the user interaction profile comprises:

comparing, by the server, the amount of time that users spend interacting with the item at the location to a threshold; and determining, by the server, that the location is associated with a high or low level of user interaction in response to determining that the amount of time that users interacts with the item above or below the threshold and wherein the user interaction profile indicates whether the location is associated with the high or low level of user interaction.

* * * * *